(12) United States Patent
Stell et al.

(10) Patent No.: US 10,653,994 B2
(45) Date of Patent: May 19, 2020

(54) FUEL VAPOR FILTER FOR A TANK VENTILATING DEVICE OF A MOTOR VEHICLE WITH IMPROVED CHARGING PROPERTIES

(71) Applicant: KAUTEX TEXTRON GMBH & CO. KG, Bonn (DE)

(72) Inventors: Bjorn Stell, Bergisch Gladbach (DE); Manfred Pruser, Rheinbach (DE); Lars Hansonis, Ahrweiler (DE); Volker Treudt, Windeck (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 16/303,122

(22) PCT Filed: May 3, 2017

(86) PCT No.: PCT/EP2017/060542
§ 371 (c)(1),
(2) Date: Nov. 20, 2018

(87) PCT Pub. No.: WO2017/198466
PCT Pub. Date: Nov. 23, 2017

(65) Prior Publication Data
US 2019/0374901 A1    Dec. 12, 2019

(30) Foreign Application Priority Data
May 20, 2016   (DE) .................. 10 2016 208 787

(51) Int. Cl.
*F02M 25/08*   (2006.01)
*B01D 53/04*   (2006.01)
*B60K 15/035*   (2006.01)

(52) U.S. Cl.
CPC ..... *B01D 53/0446* (2013.01); *F02M 25/0854* (2013.01); *B01D 2253/102* (2013.01);
(Continued)

(58) Field of Classification Search
CPC ............ F02M 25/0854; B01D 53/0446; B01D 2253/102; B01D 2259/4516; B60K 2015/03514
(Continued)

(56) References Cited

U.S. PATENT DOCUMENTS

| 4,717,401 A | 1/1988 | Lupoli et al. |
| 5,119,791 A * | 6/1992 | Gifford .............. F02M 25/0854 |
| | | 123/516 |

(Continued)

FOREIGN PATENT DOCUMENTS

| CN | 102159823 A | 8/2011 |
| CN | 103987557 A | 8/2014 |

(Continued)

OTHER PUBLICATIONS

"International Preliminary Report on Patentability received for PCT Application No. PCT/EP20171060542, dated Aug. 1, 2018", 39 pages.

(Continued)

*Primary Examiner* — Frank M Lawrence, Jr.
(74) *Attorney, Agent, or Firm* — Wiley Rein LLP

(57) ABSTRACT

The present invention discloses a fuel vapor filter for a tank ventilation device of a motor vehicle, wherein the fuel vapor filter has a filter housing with a receiving space for receiving a filter material for at least temporarily binding fuel vapors. The filter housing has a charging opening for the introduction of fuel vapors into the receiving space and a ventilation opening for the ventilation of the receiving space. The fuel vapor filter has a diverting device which is arranged in the
(Continued)

receiving space and which serves for diverting a fluid flow between the charging opening and the ventilation opening. The diverting device is arranged in a region between the charging opening and the ventilation opening or in a region between the charging opening and a passage opening of a fluid channel fluidically connected to the ventilation opening.

6 Claims, 4 Drawing Sheets

(52) U.S. Cl.
CPC .......... *B01D 2257/702* (2013.01); *B01D 2259/4516* (2013.01); *B60K 2015/03514* (2013.01)

(58) Field of Classification Search
USPC ...... 96/121, 139, 147, 152; 95/146; 123/519
See application file for complete search history.

(56) References Cited

U.S. PATENT DOCUMENTS

| | | | |
|---|---|---|---|
| 5,538,543 A | 7/1996 | Watanabe et al. | |
| 6,599,350 B1* | 7/2003 | Rockwell | B01D 45/12 123/519 |
| 6,863,714 B2* | 3/2005 | De Biasio | B01D 53/0415 123/519 |
| 8,529,676 B2* | 9/2013 | Sugiura | F02M 25/0854 123/519 |
| 2005/0279210 A1 | 12/2005 | Hirata | |
| 2011/0168025 A1 | 7/2011 | Huynh | |
| 2014/0352541 A1* | 12/2014 | Omichi | F02M 25/0854 96/152 |

FOREIGN PATENT DOCUMENTS

| | | |
|---|---|---|
| DE | 4320384 A1 | 12/1994 |
| EP | 2326824 B1 | 9/2012 |
| EP | 2773523 B1 | 12/2017 |
| JP | 2006-002730 A | 1/2006 |
| WO | 2014016102 A1 | 1/2014 |
| WO | 2017/198466 A1 | 11/2017 |

OTHER PUBLICATIONS

Office Action Received for Chinese Patent Application No. 201780044214.0, dated May 30, 2019, 5 pages.

International Search Report and Written Opinion, dated Jun. 30, 2017, issued in International Application No. PCT/EP2017/060542, filed May 3, 2017.

* cited by examiner

FUEL VAPOR FILTER FOR A TANK VENTILATING DEVICE OF A MOTOR VEHICLE WITH IMPROVED CHARGING PROPERTIES

RELATED APPLICATIONS

This application is a § 371 National Stage Application of PCT/EP2017/060542, filed May 3, 2017, which claims priority benefit of German Patent Application No. 102016208787.8, filed May 20, 2016, which applications are incorporated entirely by reference herein for all purposes.

FIELD

The present invention relates to a fuel vapor filter for a tank ventilation device of a motor vehicle.

BACKGROUND ART

In the case of a motor vehicle driven by means of an internal combustion engine, in particular by means of a spark-ignition engine, there is the problem that the vapors situated in the fuel tank and laden with hydrocarbons must not be released to the surroundings of the motor vehicle without prior filtering. For this purpose, in motor vehicles, fuel vapor filters, commonly in the form of activated carbon filters, are provided, which are fluidically connected by means of a charging opening of the fuel vapor filter to a tank volume and by means of a ventilation opening of the fuel vapor filter to the internal combustion engine and/or to the surroundings of the motor vehicle. When vapors that escape from the fuel tank are conducted through the fuel vapor filter, hydrocarbons are absorbed and/or adsorbed by the filter material, such that the gas filtered in this way can be released to the surroundings. The filter material laden with hydrocarbons is generally purged by means of intake air of the internal combustion engine, such that hydrocarbons absorbed by means of the filter material are fed to the internal combustion engine. In this way, the absorption capacity of the fuel vapor filter is realized.

During filling of a fuel tank, fuel is introduced into the fuel tank at a rate of up to 60 l/min (liters per minute). Consequently, during the tank filling process, a correspondingly large volume flow of 60 l/min of gas laden with fuel vapors must be conducted through the fuel vapor filter. Here, the fuel vapor filter must be dimensioned such that, even in the case of such high volume flows, hydrocarbons are reliably filtered out by means of the filter material.

During the operation of the motor vehicle, the fuel situated in the fuel tank is subject to movements, such that increasing amounts of hydrocarbons are transferred into the gaseous phase, whereby the internal pressure in the fuel tank increases. In the event of a pressure increase, or an exceedance of a predefined threshold pressure, the fuel tank must be ventilated via the fuel vapor filter, wherein volume flows in the region of 40 l/h (liters per hour) are conducted through the fuel vapor filter.

Even when the motor vehicle is at a standstill, hydrocarbons are transferred into the gaseous phase owing to thermal influences. In this situation, a volume flow in the region of 0.6 l/h prevails in the ventilation of the fuel tank.

A fuel vapor filter must consequently be capable of being operated with widely varying ventilation volume flows from 0.6 l/h to 60 l/min (that is to say six thousand times the ventilation volume flow of 0.6 l/h).

In the case of a high ventilation volume flow of 60 l/min, the gas to be filtered moves, owing to its high kinetic energy and its inertia, on an approximately straight path from the charging opening to the ventilation opening of the fuel vapor filter. Consequently, filter material that is not arranged in the region of a direct connecting line between the charging opening and the ventilation opening within the fuel vapor filter is not impinged on, or is impinged on only to a reduced extent, by the gas to be filtered.

By contrast, in the case of a low ventilation volume flow of 0.6 l/h, an entirely different flow situation prevails within the fuel vapor filter. This is because the gas to be filtered, owing to its relatively high density (in relation to air not laden with hydrocarbons), follows the gravitational force, such that, between the charging opening and the ventilation opening, the gas to be filtered impinges only on filter material in the base region of the fuel vapor filter. By contrast, filter material situated in other regions of the fuel vapor filter is not impinged on, or is impinged on only to a reduced extent, by the gas to be filtered.

WO 2014/016102 A1 describes a fuel vapor filter having a filter housing which has vapor storage regions for receiving filter material. An inlet connector and an outlet connector are provided in the housing, wherein the fuel vapor filter is fluidically connectable via the outlet connector to an internal combustion engine. The fuel vapor filter has a diverting device, by means of which gas flow paths are formed through which the gas to be filtered must flow.

DE 43 20 384 A1 describes an activated carbon filter for fuel tank ventilation. The activated carbon filter has a housing which has a first connector, a second connector and a third connector. Furthermore, the housing has at least two partitions, wherein the partition is arranged between the first connector and the third connector such that gas introduced into the housing by the first connector is diverted by at least the partition in order to be able to emerge from the housing through the third connector.

U.S. Pat. No. 5,538,543 A describes a fuel vapor filter with a housing which has a divided receiving space for receiving an adsorption medium, wherein the respective portions of the receiving space are formed as a lower chamber, middle chamber and upper chamber. The housing has a charging opening and a ventilation opening. Furthermore, the housing has a connection which is open to the atmosphere. The respective portions of the chambers are separated from one another by partitions, wherein holes are provided in each case in the partitions, which holes are arranged so as to be angularly offset with respect to one another, giving rise to a zigzag-shaped gas path during charging of the fuel vapor filter and during purging of the fuel vapor filter.

US 2011/168025 A1 also describes a fuel vapor filter which has an outer container and an inner container arranged within the outer container, wherein the longitudinal axes of the outer container and of the inner container run collinearly with respect to one another. Both in the inner container and in the outer container, there is arranged an adsorption medium in the form of activated carbon, for example.

U.S. Pat. No. 4,717,401 A describes a fuel vapor filter with two connectors. In an interior space of the fuel vapor filter, there are arranged diverting structures which are each cohesively connected to the inner wall of the housing. Consequently, during charging and during purging of the fuel vapor filter, a zigzag-shaped fluid flow is generated within the fuel vapor filter.

SUMMARY OF THE INVENTION

The present invention is based on the object of providing an improved fuel vapor filter for a tank ventilation device of a motor vehicle, in the case of which the filter material situated in the fuel vapor filter is utilized more uniformly and thus more effectively irrespective of the ventilation volume flow.

The object on which the present invention is based is achieved by means of a fuel vapor filter having the features of claim 1. Advantageous refinements of the fuel vapor filter are described in the dependent claims.

More specifically, the object on which the present invention is based is achieved by means of a fuel vapor filter for a tank ventilation device of a motor vehicle, wherein the fuel vapor filter has a filter housing with a receiving space for receiving a filter material for at least temporarily binding fuel vapors. Here, the filter housing has a charging opening for the introduction of fuel vapors into the receiving space and a ventilation opening for the ventilation of the receiving space. The fuel vapor filter according to the invention is characterized in that it has a diverting device which is arranged in the receiving space and which serves for diverting a fluid flow between the charging opening and the ventilation opening, wherein the diverting device is arranged in a region between the charging opening and the ventilation opening or in a region between the charging opening and a passage opening of a fluid channel fluidically connected to the ventilation opening.

The fuel vapor filter according to the invention offers the advantage that a distance that the gas laden with hydrocarbons must cover through the fuel vapor filter in order to pass from the charging opening of the fuel vapor filter to the ventilation opening of the fuel vapor filter is lengthened. Thus, by means of the fuel vapor filter according to the invention, in particular in the case of large ventilation volume flows such as prevail for example during a tank filling process, improved filtering of the gases displaced out of the fuel tank and laden with hydrocarbons is realized. Furthermore, the correspondingly designed fuel vapor filter offers the advantage that the filter material stored in the filter housing is impinged on with fuel vapors in an improved manner. Thus, less filter material has to be stored in the fuel vapor filter in order to realize a predefined absorption capacity, such that the correspondingly designed fuel vapor filter is of compact construction.

The diverting device is preferably not permeable to fluid with regard to the fluid flow composed of fuel vapors. For example, the diverting device may have a diverting wall arrangement or a diverting wall, or be formed as a diverting wall arrangement/diverting wall. Here, the diverting device may have one or more wall arrangement elements of planar form or of curved form.

The diverting device is consequently positioned on a connecting line between the charging opening and the ventilation opening or between the charging opening and the passage opening.

The charging opening is preferably arranged in an upper region of the filter housing in an installed position of the fuel vapor filter. This is because, in particular in the case of a charging opening arranged in the upper region of the filter housing in the installed position, the gas to be filtered is conducted through more filter material, because the gas to be filtered, after being introduced through the charging opening, follows the gravitational force and falls to the filter housing base. Consequently, the filter material situated on the path to the filter housing base is also charged with hydrocarbons, which is not the case in fuel vapor filters known from the prior art. The filter housing base is to be understood to mean the lowest region of the fuel vapor filter in the installed position thereof.

The fuel vapor filter may preferably be designed as an adsorption filter, wherein, in a corresponding embodiment of the adsorption filter, the filter material is in the form of adsorption material. For example, the fuel vapor filter may be in the form of an activated carbon filter, wherein, in the case of a corresponding design of the fuel vapor filter, the filter material is in the form of activated carbon, which is arranged preferably in the form of a granulate in the receiving space of the filter housing.

The binding of the fuel vapors by means of the filter material may take place by adsorption of the fuel vapors, that is to say of hydrocarbons, by the filter material.

The fuel vapor filter is preferably designed such that the charging opening opens directly into the receiving space of the filter housing. The correspondingly designed fuel vapor filter offers the advantage that, even and in particular in the case of small ventilation volume flows, improved charging of the filter material situated in the receiving space with hydrocarbons of the fuel vapor conducted through the fuel vapor filter is achieved.

Preferably, the fuel vapor filter is designed such that the diverting device has an extent, directed perpendicular to a longitudinal axis of the filter housing, of at least 30% of a clear width of the filter housing.

By means of a corresponding design of the fuel vapor filter, a yet further improved diversion of the gases to be filtered through the fuel vapor filter is achieved, such that, with a predefined amount of filter material, improved filtering of fuel vapors by the fuel vapor filter is achieved. Furthermore, in the case of a corresponding design of the fuel vapor filter with a predefined filter capacity, this can be achieved with a reduced amount of filter material.

The extent, directed perpendicular to the longitudinal axis of the filter housing, of the diverting device preferably amounts to at least 40%. It is furthermore preferable for the extent, directed perpendicular to the longitudinal axis of the filter housing, of the diverting device to amount to at least 50%. It is furthermore preferable for the extent, directed perpendicular to the longitudinal axis of the filter housing, of the diverting device to amount to at least 60% or more.

The clear width of the filter housing is to be understood to mean the maximum passage area of the filter housing. Here, the passage area may be oriented perpendicular to a connecting line between the charging opening and the ventilation opening or the passage opening. In the case of, for example, a cylindrically designed filter housing, the surface normal of the passage area thereof is oriented parallel to a longitudinal axis of the filter housing.

It is furthermore preferable for the fuel vapor filter to be designed such that the diverting device extends from a filter housing wall to at least a longitudinal axis of the filter housing.

By means of a corresponding design of the fuel vapor filter, a yet further improved diversion of the gases to be filtered at least toward the longitudinal axis through the fuel vapor filter is achieved, such that, with a predefined amount of filter material, improved filtering of fuel vapors by the fuel vapor filter is achieved. Furthermore, in the case of a corresponding design of the fuel vapor filter with a predefined filter capacity, this can be achieved with a reduced amount of filter material.

In a further advantageous refinement of the fuel vapor filter, this is designed such that the charging opening and the ventilation opening, or the passage opening fluidically connected to the ventilation opening by means of the fluid channel, are arranged in an upper region of the filter housing in an installed position of the fuel vapor filter.

As a result of the charging opening and the ventilation opening, or the passage opening fluidically connected to the ventilation opening by means of the fluid channel, being arranged in the upper region of the filter housing in the installed position of the adsorption filter, the charging characteristics of the adsorption filter in particular in the case of small ventilation volume flows, such as prevail when the vehicle is in operation and/or at a standstill, are considerably improved. This is because the gas to be filtered, as it is introduced into the filter housing, flows so as to follow the gravitational force in the direction of a lower region of the filter housing, such that the adsorption material situated in the direction of movement of the gas to be filtered can be utilized for the filtering. In order that the gas to be filtered can escape from the filter housing via the ventilation opening, the gas to be filtered must flow in the filter housing into the upper region of the filter housing, such that the adsorption material situated in the direction of movement of the gas to be filtered can also be utilized for the filtering. Consequently, by means of a corresponding arrangement of the charging opening and of the ventilation opening or of the passage opening, the effective filter bed length can be increased, and more filter material can be used for the filtering of the fuel vapors. Consequently, a yet further improved diversion of the gases to be filtered through the fuel vapor filter is achieved, such that, with a predefined amount of filter material, improved filtering of fuel vapors by the fuel vapor filter is achieved. Furthermore, in the case of a corresponding design of the fuel vapor filter with a predefined filter capacity, this can be achieved with a reduced amount of filter material.

In a corresponding embodiment of the filter housing, the gas to be filtered consequently follows a movement path which corresponds to an upside-down omega.

In a further advantageous refinement of the fuel vapor filter, the filter housing has an outer container and an inner container arranged within the outer container, wherein both the outer container and the inner container are at least partially filled with the filter material, wherein the inner container is fluidically connected to the outer container by means of an inlet opening of the inner container, and wherein the charging opening opens into the outer container and the ventilation opening opens into the inner container.

In the case of the correspondingly designed fuel vapor filter, the distance that the gas to be filtered must cover through the fuel vapor filter in order to pass from the charging opening to the ventilation opening is lengthened yet further, such that improved filtering of the hydrocarbons out of the gas to be filtered is achieved.

The inlet opening of the inner container is preferably an end-side opening of the inner container. Consequently, the inlet opening of the inner container is fluidically connected to the ventilation opening of the inner container. The inlet opening of the inner container is preferably situated within an outer container receiving space.

In a corresponding embodiment of the fuel vapor filter, it is possible for the charging opening and the ventilation opening to be arranged on the same side of the fuel vapor filter. In the case of a fuel vapor filter of cylindrical form, the charging opening and the ventilation opening may be arranged at an end side of the fuel vapor filter.

A longitudinal axis of the outer container may preferably run parallel to a longitudinal axis of the inner container. It is furthermore preferable for the longitudinal axes of the outer container and of the inner container to run collinearly with respect to one another.

Here, the fuel vapor filter is preferably designed so as to have a holding frame which is arranged within the outer container and which has at least one passage opening, wherein the inner container is fixed in the outer container by means of the holding frame, and wherein an inner container receiving space is fluidically connected by means of the passage opening of the holding frame and by means of the inlet opening of the inner container to an outer container receiving space.

Consequently, the passage opening of the fluid channel fluidically connected to the ventilation opening is formed by the holding frame. The holding frame preferably has a holding opening into which the inner container is inserted. The inner container is preferably welded to the holding frame, or connected to said holding frame in some other suitable manner.

The fuel vapor filter is furthermore preferably designed such that the diverting device is arranged on an outer side of the inner container or on an inner side of the outer container.

The correspondingly designed fuel vapor filter has a simple construction, wherein it remains ensured that the effective filter length or filter distance is lengthened, such that improved impingement of the fuel vapors on the filter material is always realized irrespective of the ventilation volume flows.

The diverting device is preferably connected to the inner container or to the outer container. It is furthermore preferable for the diverting device and the inner container or the diverting device and the outer container to be formed in one piece.

In a further advantageous embodiment of the fuel vapor filter, the diverting device is of spiral-shaped form.

In the case of a spiral-shaped diverting device, the effective distance that the gas to be filtered must cover between the charging opening and the ventilation opening is lengthened yet further. Irrespective of the ventilation volume flow, (approximately) the entire filter material stored in the fuel vapor filter is flowed through, such that less filter material is required to realize a predefined absorption capacity.

The central axis of the spiral-shaped diverting device runs preferably parallel to the longitudinal axis of the filter housing. It is furthermore preferable for the central axis of the spiral-shaped diverting device to be collinear with respect to the longitudinal axis of the filter housing. If the filter housing has an outer container and an inner container, the central axis of the spiral-shaped diverting device is preferably parallel, more preferably collinear, with respect to the longitudinal axes of the inner container and of the outer container.

In a further advantageous refinement of the fuel vapor filter, the diverting device extends from an outer surface of the inner container to an inner surface of the outer container.

By means of a corresponding design of the fuel vapor filter, the situation in which the fluid flow bypasses the diverting device is counteracted or prevented.

BRIEF DESCRIPTION OF THE DRAWINGS

Further advantages, details and features of the invention will emerge below from the exemplary embodiments discussed. Here, in detail.

DETAILED DESCRIPTION OF THE EMBODIMENTS

In the description that now follows, the same reference designations are used to denote identical components or identical features, such that a description of a component given with regard to one figure also applies to the other figures, such that a repeated description is avoided. Furthermore, individual features described in conjunction with one embodiment may also be used separately in the other embodiments.

Figure 1:
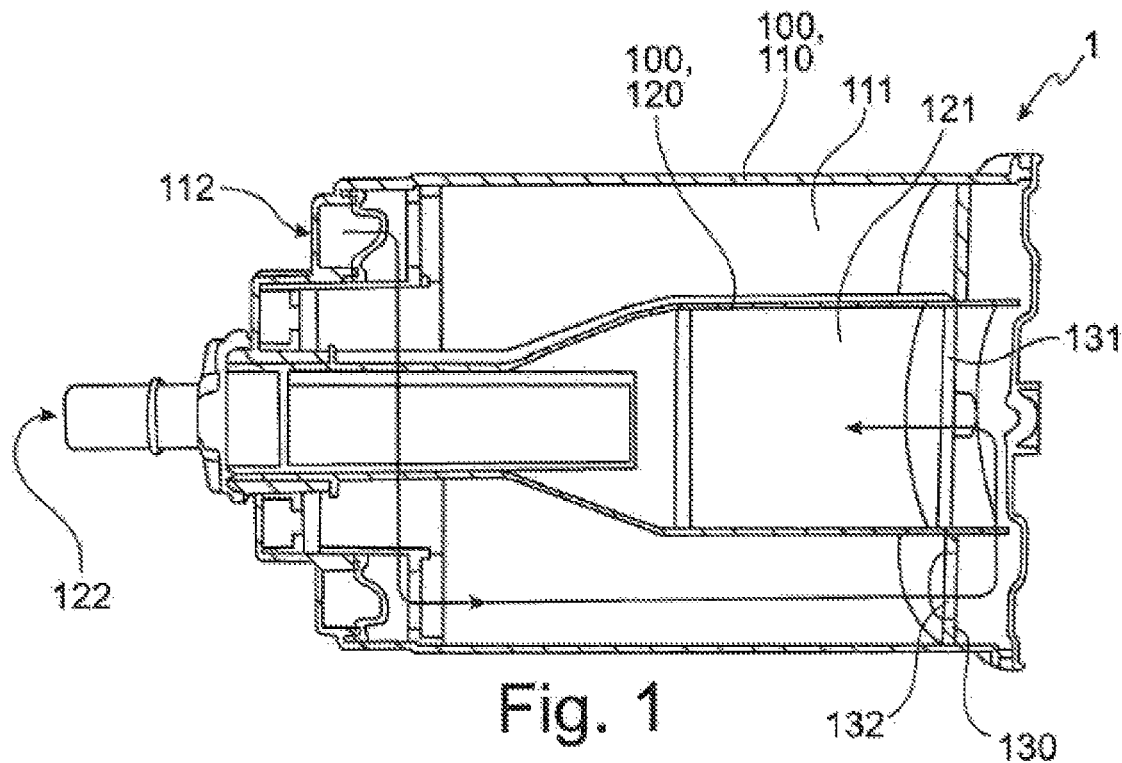
FIG. 1 is a cross-sectional illustration of a fuel vapor filter known from the prior art.

FIG. 1 is a cross-sectional illustration of a fuel vapor filter 1 known from the prior art. It can be seen that a charging opening 112 for the introduction of fuel vapors into the fuel vapor filter 1 opens into an intermediate space between a receiving space 111 of the fuel vapor filter 1, which is designed for receiving filter material, and an outer wall, illustrated on the left in FIG. 1, of the fuel vapor filter 1. No filter material is arranged within said intermediate space, such that, in the presence of a small ventilation volume flow such as prevails for example when a motor vehicle is at a standstill, the gas to be filtered sinks downward within the intermediate space, following the gravitational force, without being conducted through filter material.

Figure 2:
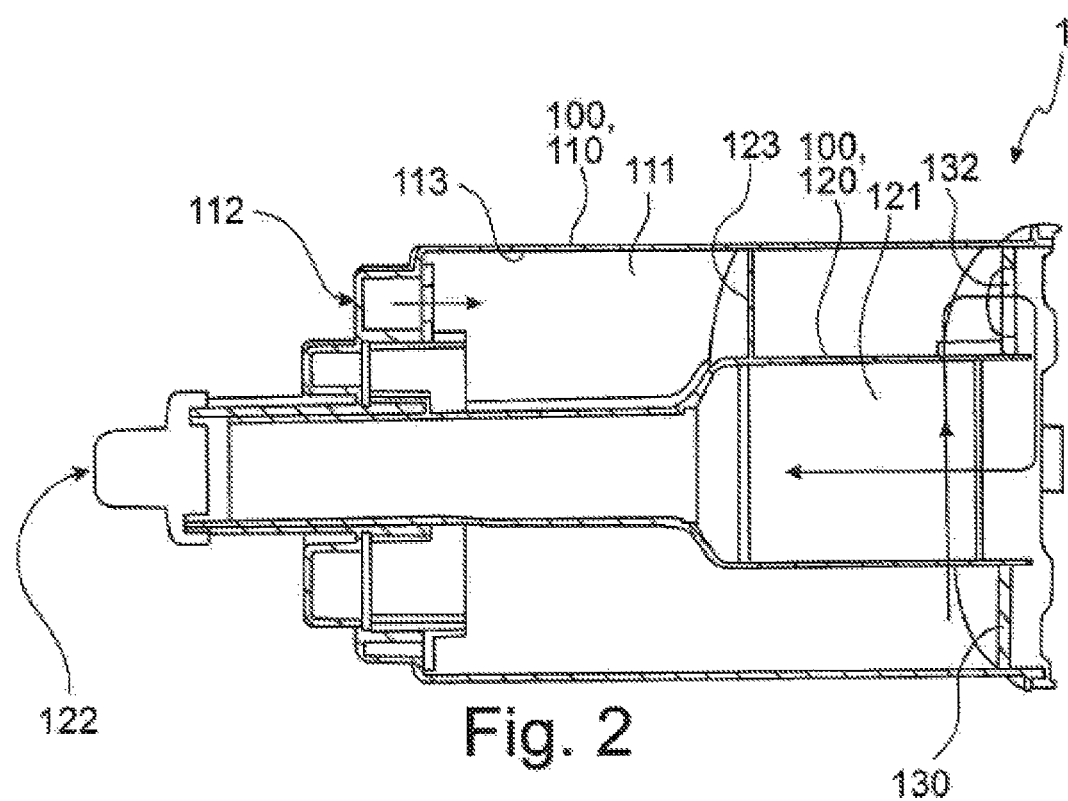
FIG. 2 is a cross-sectional illustration of a fuel vapor filter according to the invention.
Figure 6:
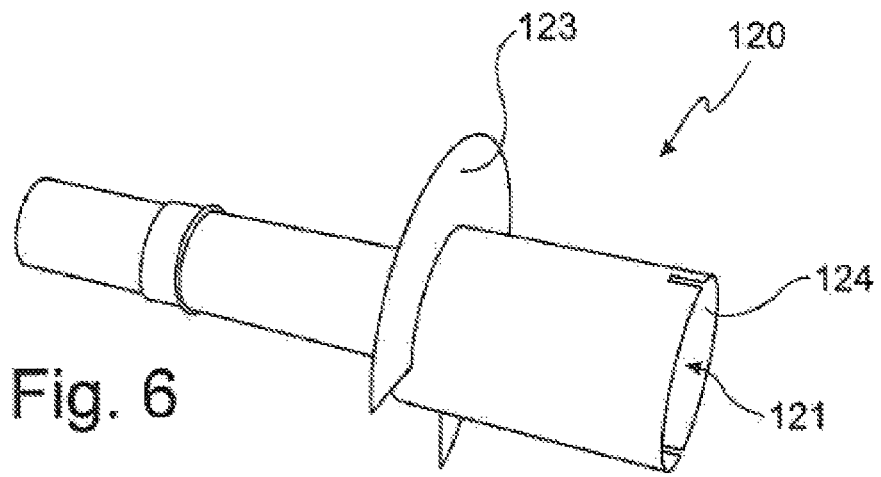
FIG. 6 is a three-dimensional illustration of an inner container of the fuel vapor filter illustrated in FIGS. 2 and 5.

FIG. 2 is a cross-sectional illustration of a fuel vapor filter 1 according to the invention. The fuel vapor filter 1 has a filter housing 100 which, in the exemplary embodiment illustrated, has an outer container 110 and an inner container 120 arranged within the outer container 110. The outer container 110 has an outer container receiving space 111, which can also be referred to as outer container interior space 111 and which is designed for receiving filter material. The filter material may for example be activated carbon. The inner container 120 has an inner container receiving space 121, which can also be referred to as inner container interior space 121 and which is likewise designed for receiving filter material. The inner container 120 is fluidically connected to the outer container 110 via an inlet opening 124 (see FIG. 6) of the inner container 120, wherein it can be seen from FIG. 2 that the inlet opening 124 is positioned within the outer container receiving space 111.

For the introduction of fuel vapors into the fuel vapor filter 1, the latter has a charging opening 112, which opens into the outer container 110 in the upper region thereof in the installed position. Furthermore, for the discharging of the filtered gases, the fuel vapor filter 1 has a ventilation opening 122, which opens into the inner container 120.

It can be seen from FIG. 2 that the inner container 120 is held within the outer container 110 by means of a holding frame 130 arranged within the outer container 110. Here, the inner container 120 is preferably welded to the holding frame 130. From FIGS. 3 and 4, which each illustrate a holding frame 130 on its own, it can be seen that the holding frame 130 has a holding opening 131 for holding the inner container 120. Holding or fixing of the inner container 120 within the outer container 110 is realized by virtue of the inner container 120 being inserted into the holding opening 131 of the holding frame 130.

Figure 3:
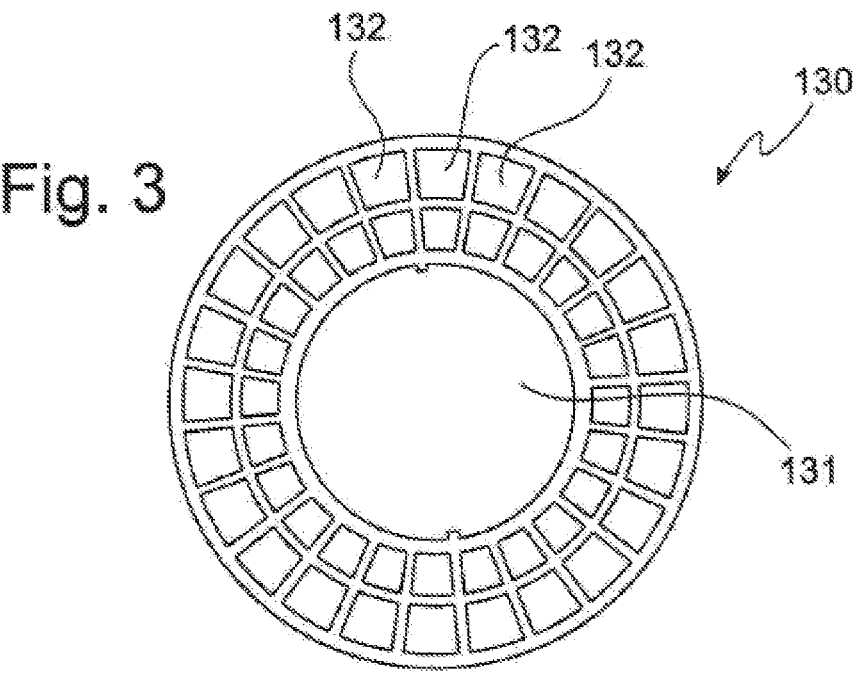
FIG. 3 shows a plan view of a holding frame of the fuel vapor filter.
Figure 4:
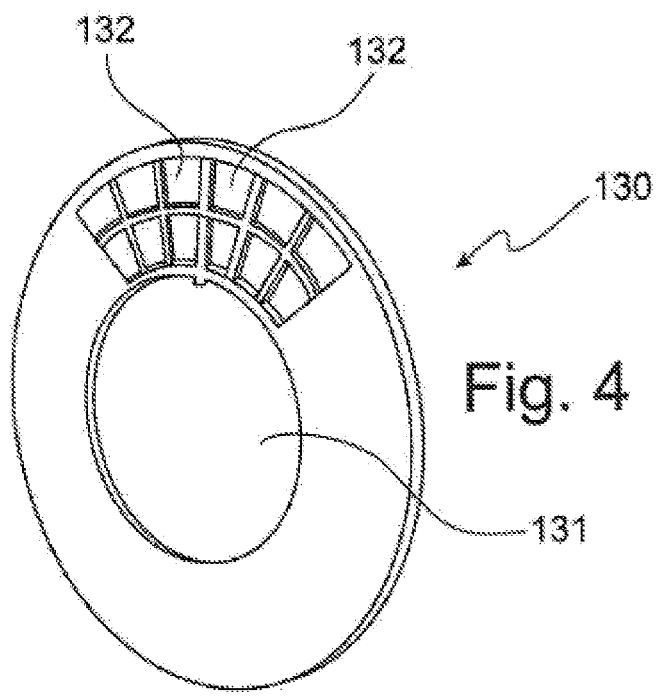
FIG. 4 is a perspective illustration of a further holding frame of a fuel vapor filter of a further embodiment of the present invention.

As can be seen from FIGS. 3 and 4, the holding frame 130 has a multiplicity of passage openings 132. The outer container receiving space 111 is fluidically connected via the passage openings 132 of the holding frame 130 and the inlet opening 124 of the inner container 120 to the inner container receiving space 121.

The flow path that the fuel vapors introduced into the fuel vapor filter 1 must cover consequently begins at the charging opening 112 through which the fuel vapors are introduced into the inner container receiving space 111. After flowing through the outer container receiving space 111, the fuel vapors are conducted through the passage openings 132 of the holding frame 130 into a fluid channel which is arranged between the outer container receiving space 111 and the inner container receiving space 121. Said fluid channel is fluidically connected via the inlet opening 124 of the inner container 120 to the inner container receiving space 121. After flowing through the inner container receiving space 121, the gases filtered by the filter material arranged within the outer container receiving space 111 and within the inner container receiving space 121 can be conducted out of the fuel vapor filter 1 through the ventilation opening 122.

It can also be seen from FIG. 2 that the charging opening 112 opens directly into the outer container receiving space 111. By means of a corresponding direct introduction of the fuel vapors into the receiving space 111 of the fuel vapor filter 1, a lengthened filter path for the gases to be filtered is made possible in particular in the case of small ventilation volume flows, such as prevail for example during the ventilation of a fuel tank when a motor vehicle is at a standstill. This is because, in the installed position of the fuel vapor filter 1 illustrated in FIG. 2, the fuel vapors, in the presence of a small ventilation volume flow, follow the gravitational force and sink to the housing base, illustrated at the bottom in FIG. 2, of the fuel vapor filter 1. Already as the fuel vapors sink downward, they pass through filter material arranged within the receiving space 111, such that said path from the charging opening 112 to the housing base of the fuel vapor filter 1 can be utilized for the filtering of the fuel vapors.

It can also be seen from FIG. 2 that the fuel vapor filter 1 has a diverting device 123 for diverting a fluid flow. In the exemplary embodiment illustrated in FIG. 2, the diverting device 123 is formed as a diverting wall 123 connected to the inner container 120. The diverting wall 123 is arranged between the charging opening 112 and the passage openings 132, arranged in the upper region of the fuel vapor filter 1, of the holding frame 130. Thus, in the presence of a large ventilation volume flow, such as prevails for example during a tank filling process, a flow through the receiving space 111 on a direct path from the charging opening 112 to the passage openings 132 is prevented.

Figure 5:
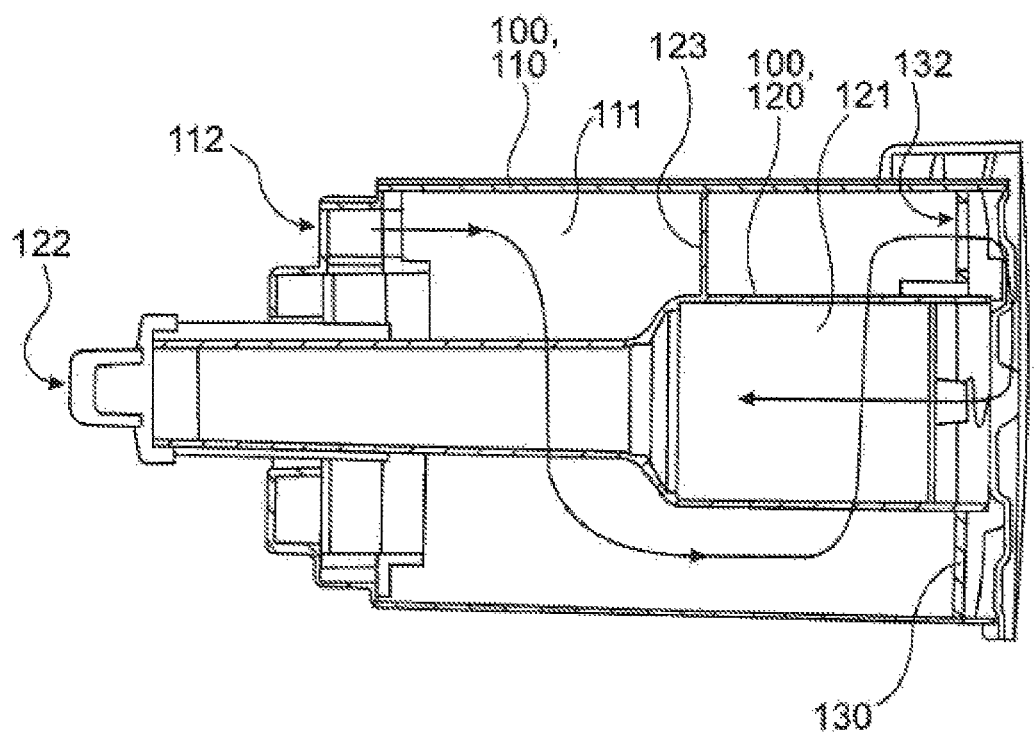
FIG. 5 is a cross-sectional illustration of a fuel vapor filter according to a further embodiment of the present invention, with a possible ventilation flow within the fuel vapor filter indicated.

FIG. 5 illustrates a flow path of the fuel vapors through the fuel vapor filter 1. It can be seen that the through flow path does not lead directly from the charging opening 112 to the passage openings 132 of the holding frame 130. Rather, the fuel vapors must, after being introduced into the outer container receiving space 111, flow via the charging opening 112 into a lower region of the fuel vapor filter 1 (in the installed position of the fuel vapor filter 1), whereupon, after passing through the diverting wall 123, the fuel vapors must again flow into an upper region, in the installed position, of the fuel vapor filter 1 in order to flow through the passage openings 132, whereupon the fuel vapors are conducted via the inlet opening 124 into the inner container receiving space 121.

In the fuel vapor filter 1 illustrated in FIGS. 2 and 5, the holding frame 130 illustrated in FIG. 4 is installed. The holding frame 130 illustrated in FIG. 4 differs from the holding frame 130 illustrated in FIG. 3 in that the passage openings 132 are arranged only in an upper region, in the installed position of the fuel vapor filter 1, of the holding frame 130. In this way, the through flow path of the fuel vapors illustrated in FIG. 5 is realized.

Figure 7:
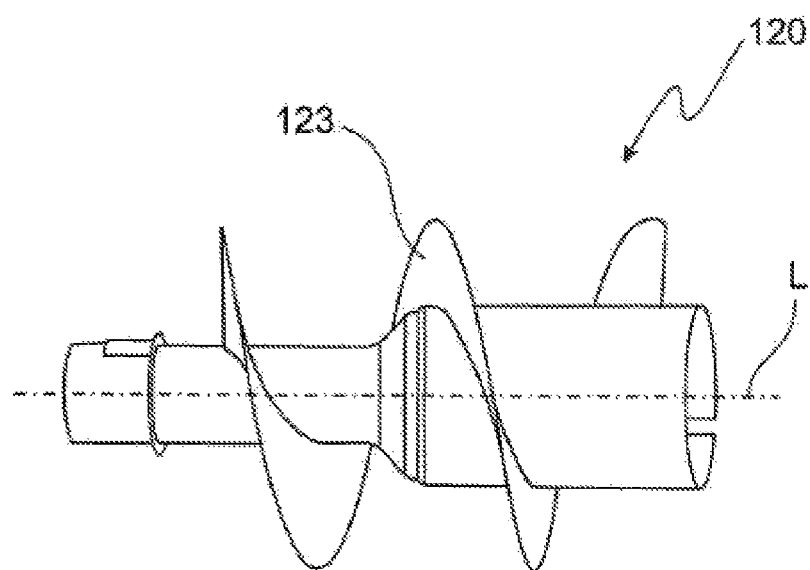
FIG. 7 is a three-dimensional illustration of an inner container of a fuel vapor filter according to a further embodiment of the present invention.

FIG. 7 illustrates an inner container 120 of a fuel vapor filter 1 as per a further embodiment on its own. The diverting device 123 is in this case of spiral-shaped form and arranged on an outer side of the inner container 120. By means of a corresponding spiral-shaped form of the diverting device 123, it is achieved that, as they flow through the outer container interior space 111, the fuel vapors to be filtered must cover a longer path from the charging opening 112 to the passage openings 132, such that more effective filtering of the fuel vapors by the filter material is achieved. In the exemplary embodiment illustrated, a central axis L or a longitudinal axis L of the spiral-shaped diverting device 123 is oriented collinearly with respect to a longitudinal axis of the outer container 110 and a longitudinal axis L of the inner container 120.

LIST OF REFERENCE DESIGNATIONS

1 Fuel vapor filter
100 Filter housing
110 Outer container (of the filter housing)
111 Receiving space (of the filter housing)/Outer container receiving space/Outer container interior space
112 Charging opening (of the filter housing)
113 Filter housing wall (of the outer container)
120 Inner container (of the filter housing)
121 Receiving space (of the filter housing)/Inner container receiving space/Inner container interior space
122 Ventilation opening (of the filter housing)
123 Diverting device/Diverting wall arrangement/Diverting wall
124 Inlet opening (of the inner container)
130 Holding frame
131 Holding opening (of the holding frame)
132 Passage opening (of the holding frame)
L Longitudinal axis (of the filter housing, of the outer container, of the inner container)

The invention claimed is:

1. A fuel vapor filter (1) for a tank ventilation device of a motor vehicle, comprising:
   a filter housing (100; 110, 120) with a receiving space (111, 121) for receiving a filter material for at least temporarily binding fuel vapors, wherein
   the filter housing (100; 110, 120) has a charging opening (112) for the introduction of fuel vapors into the receiving space (111, 121) and a ventilation opening (122) for the ventilation of the receiving space (111, 121);
   the filter housing (100; 110, 120) has an outer container (110) and an inner container (120) arranged within the outer container (110), wherein both the outer container (110) and the inner container (120) are at least partially filled with the filter material;
   the inner container (120) is fluidically connected to the outer container (110) by means of an inlet opening (124) of the inner container (120);
   the charging opening (112) opens into the outer container (110) and the ventilation opening (122) opens into the inner container (120); and
   a diverting device (123) which is arranged in the receiving space (111, 121) and which serves for diverting a fluid flow between the charging opening (112) and the ventilation opening (122), wherein
   the diverting device (123) is not permeable to the fluid flow composed of fuel vapors,
   the diverting device (123) is arranged in a region between the charging opening (112) and the ventilation opening (122) or in a region between the charging opening (112) and a passage opening (132) of a fluid channel fluidically connected to the ventilation opening (122), and
   the diverting device (123) is arranged on an outer side of the inner container (120) or on an inner side of the outer container (110).

2. The fuel vapor filter (1) of claim 1, wherein the diverting device (123) has an extent, directed perpendicular to a longitudinal axis (L) of the filter housing (100; 110, 120), of at least 30% of a clear width of the filter housing (100; 110, 120).

3. The fuel vapor filter (1) of claim 1, wherein the charging opening (112) and the ventilation opening (122), or the passage opening (132) fluidically connected to the ventilation opening (122) by means of the fluid channel, are arranged in an upper region of the filter housing (100; 110, 120) in an installed position of the fuel vapor filter (1).

4. The fuel vapor filter (1) of claim 1, further comprising:
   a holding frame (130) which is arranged within the outer container (110) and which has at least one passage opening (132), wherein
   the inner container (120) is fixed in the outer container (110) by means of the holding frame (130); and
   an inner container receiving space (121) is fluidically connected by means of the passage opening (132) of the holding frame (130) and by means of the inlet opening (124) of the inner container (120) to an outer container receiving space (111).

5. The fuel vapor filter (1) of claim 1, wherein the diverting device (123) is of spiral-shaped form.

6. The fuel vapor filter (1) of claim 4, wherein the diverting device (123) extends from an outer surface of the inner container (120) to an inner surface of the outer container (110).

* * * * *